United States Patent [19]
Lozano

[11] 3,925,028
[45] Dec. 9, 1975

[54] TREATMENT OF SEAWATER BRINES WITH AN ALCOHOL TO RECOVER A FERTILIZER QUALITY DOUBLE SALT

[76] Inventor: José Antonio Fernández Lozano, Apartado de Correos No. 4526, Puerto La Cruz; Edo. Anzoatequi, Venezuela

[22] Filed: Dec. 26, 1972

[21] Appl. No.: 318,600

[52] U.S. Cl. ............... 23/298; 23/300; 23/302 R; 23/304; 423/170; 423/178
[51] Int. Cl.² ............... B01D 9/00; C13K 1/10
[58] Field of Search ........... 23/297, 304, 298, 300, 23/302, 296; 423/170, 158, 166; 203/DIG. 17

[56] References Cited
UNITED STATES PATENTS

| | | |
|---|---|---|
| 2,381,994 | 8/1945 | Belchetz ........................ 23/304 |
| 2,479,001 | 8/1949 | Burke et al. .................... 23/298 |
| 3,357,800 | 12/1967 | Gaska ........................... 23/304 |
| 3,499,725 | 3/1970 | Scarfi et al. ................... 23/304 |
| 3,598,522 | 8/1971 | Lewis ........................... 423/166 |

Primary Examiner—Jack Sofer
Assistant Examiner—Frank Sever

[57] ABSTRACT

The present invention relates to a novel method for the recovery of potassium and magnesium salts in the form of insoluble precipitates of potassium sulfate together with magnesium sulfate and or potassium sulfate and magnesium chloride from seawater brines. A characteristic feature of this invention is the employement of methanol under controlled brine density for the selective separation of potassium sulfate and magnesium sulfate in the presence of magnesium chloride, sodium salts, and other salts.

5 Claims, 1 Drawing Figure

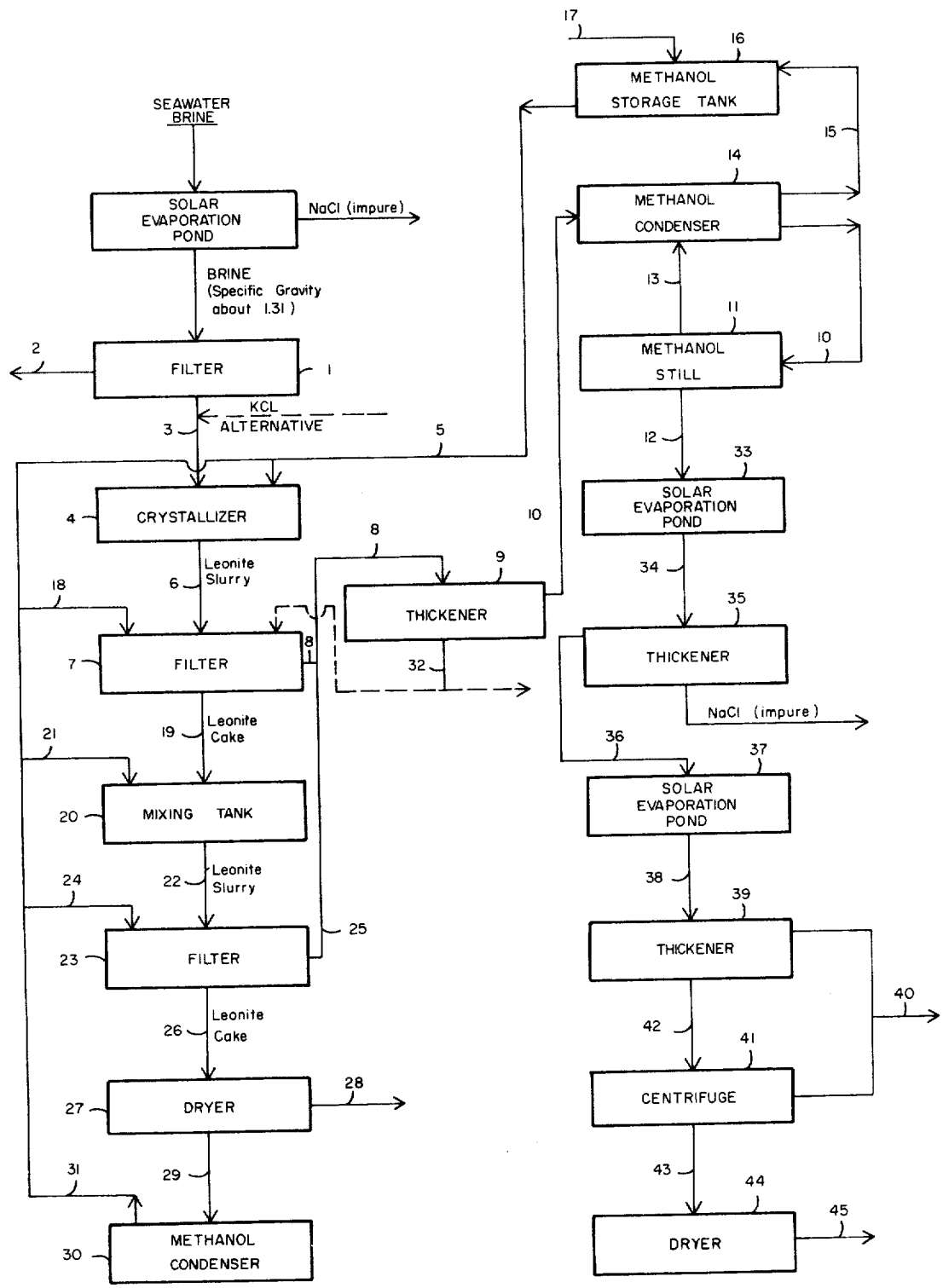

TREATMENT OF SEAWATER BRINES WITH AN ALCOHOL TO RECOVER A FERTILIZER QUALITY DOUBLE SALT

The brine is mixed with the said organic solvent in a salting tank and potassium sulfate and magnesium sulfate are crystallized. Potassium chloride is added to the brine to vary the ratio of potassium sulfate to magnesium sulfate in the final product. The methanol is recovered by distillation and recycled to the process, and the residual solution from distillation is solar evaporated to bring about the crystallization of hexahydrate magnesium chloride. The said salt is separated from the brine by filtration and dried to bihydrate magnesium chloride. The methanol washings and filtrates from the process are conducted to a thickener, there, small amount of potassium sulfate together with magnesium sulfate and sodium sulfate salts are formed. For the process several operations are necessary: Firstly, concentration of the seawater brine to be processed by solar evaporation or otherwise, mixing the concentrated brine with potassium chloride and the organic solvent, crystallization of the different salts, filtration to recover the salts, distillation of the filtrates and washings to recuperate the methanol and recycling it back to the process, evaporation and drying.

Due to their solubility characteristics, several inorganic simple salts and double salts may be selectively crystallized from aqueous solutions under given conditions when certain type of organic solvents are added.

In the research and development work leading to the present invention it was found that selection of the appropriate mole fraction of the said organic solvent, salting residence time and concentration of the seawater brine permits the recovery of potassium sulfate together with magnesium sulfate and or potassium sulfate, uncontaminated by sodium chloride, magnesium chloride and other salts.

This invention is based among other things upon the recognition that the forementioned characteristics are utilized for the recovery on commercial scale of potassium and magnesium salts in the form of insoluble precipitates of potassium sulfate together with magnesium sulfate and or potassium sulfate.

The possibility of technical realisation of the process of the present invention is based, among other things, upon the discovery that potassium and magnesium salts may be recovered from seawater brines uncontaminated by other inorganic salts present.

While the process of the present invention is applicable to a number of different salt solutions, it is of particular advantage for treatment of seawater brines, due to the fact that in this case the reserves of potassium and magnesium salts are practically inagotable.

In order to recover potassium and magnesium sulfate salts from seawater brines, in accordance with this invention, there is added to the brine free of most of the sodium chloride methanol, whereby potassium and magnesium are recovered as potassium sulfate and magnesium sulfate in the form of a white crystalline mass which can be separated from solution by filtration, decantation, or otherwise. The white crystalline mass separated from the solution and dried becomes a white crystalline powder.

Instead of the methanol, use may also be made of ethanol and mixtures of ethanol-methanol, but methanol is prefered, since it does not form azeotropic mixtures with water and requires less energy for recuperation.

As to the quantity of methanol to be used, it has been found that the process yield rises as the methanol concentration increases, but the fixed cost and operation cost also rises. It has been found advantageous to use 0.60 weight fraction of methanol for seawater brine concentrated to a density of 1.315 specific gravity, the range for the process vary widely depending upon the concentration of the brine to be processed, concentration of potassium and magnesium salts in the brine, yield and purity of the product to be recovered.

After separating the white crystalline mass, it is washed with methanol, and the washings and filtrates are conducted to a thickener where non-recovered potassium crystallizes as potassium sulfate together with magnesium sulfate and sodium sulfate, the solution overflowing from the said thickener is conducted to a distillation column to recuperate the methanol which is recycled to the process. The distillation also gives a residual solution very rich in magnesium chloride. The said solution is concentrated in a solar evaporation pond to crystallize sodium chloride and other contaminating salts. The remaining solution is further evaporated in a second solar evaporation pond bringing about the crystallization of highly pure hexahydrate magnesium chloride.

To reduce the cost of distillation and evaporation, to reduce the mole fraction of methanol to be used, and to increase yield and purity of the final product, it is desirable that the concentration of potassium and sulfate in the brine to be processed should be high in relation to other ions, and the solution should be saturated in the said ions.

It has been found advantageous to carry out the crystallization with minimum agitation and short residence time in the salting tank, but the range of this variables is wide, depending upon the concentration of the brine being processed, purity and yield of the final product.

Another important fiture of this invention is that the salt mixture of potassium sulfate and magnesium sulfate produced directly from seawater brines with density of 1.315 specific gravity contains 26 % potassium oxide, 14 % magnesium oxide, and only insignificant amount of chlorine making the said salt mixture a very desirable direct use fertilizer.

Another important future of this invention is that by adding a calculated amount of potassium chloride to the brine being processed the ratio of the potassium sulfate to magnesium sulfate may be varied from that found in the potassium magnesium sulfate salt mixture up to suitable value. As to the quantity of potassium to be used, it has been found advantageous to work without substancial excess of 30 %, calculated with reference to the sulfate content of the brine in excess.

It has been established experimentally that it is possible in this way to recover more than 95 % of potassium salts, 70 % magnesium salts and that the methanol losses in the process are negligibles.

An important object of this invention is to provide a method wherein seawater brines are treated with methanol to produce a salt mixture of potassium sulfate and magnesium sulfate directly useful as fertilizer.

A further important object of this invention is to provide a method wherein seawater brines are treated with saturated solution of potassium chloride, and methanol to produce a wide range of fertilizers wherein the ratio of potassium sulfate to magnesium sulfate may be varied.

A further important object of this invention is to provide a method wherein seawater brines are treated with methanol to produce a salt mixture of potassium sulfate together with magnesium sulfate with a weight ratio of potassium sulfate to magnesium sulfate of about one to one.

A further important object of this invention is to provide a method by which the filtrates and washings from the process after recovering the methanol are treated to produce bihydrate magnesium chloride desirable without further purification for electrolytic fabrication of metallic magnesium.

The process will now be illustrated with reference to the diagram in FIG. 1.

Seawater brine from a salt field is supplied to the salting tank 4 via line 3 in the form of a clear solution, after being concentrated to a specific gravity of 1.315 in a solar evaporation pond and filtered in filter 1 to which methanol is added in the salting tank 4 via line 5. Solids from filter 1 to waste via line 2. After the precipitate is formed in the salting tank 4 the mixture thus obtained is conducted via line 6 to filter 7. The filtrate is discharged via line 8 to the thickener 9, the clear liquid overflowed from thickener 9 at 10 is conducted via line 10 to distilling column 11, after interchange heat in heat exchanger 14 with the methanol vapors from column 11. From the said distilling column 11 a solution is drained off at 12 and methanol vapors escape at 13. After condensation of the methanol vapors in 14 the condensed methanol is conducted via line 15 to storage tank 16, from which is recycled to the process. Make up methanol is supplied to storage tank 16 via line 17. From the filter cake which has formed on filter 7 contaminating salts are removed by washing with methanol supplied via line 18. The wash methanol is passed via line 8 to the thickener 9. The partially washed cake from filter 7 is conducted via line 19 to a mixer 20 wherein more wash methanol is added via line 21, the mixture is passed via line 22 to filter 23, here, more wash methanol is added via line 24, the wash methanol is conducted via line 25 to line 8 and through this line to thickener 9. The filter cake from filter 23 is conducted via line 26 to the indirect heated rotary driver 27, from which the potassium magnesium sulfate salt mixture is conducted to storage via line 28. The methanol vapor from drier 27 is conducted via line 29 to condenser 30 from which the condensed methanol is passed via line 31 back to the process. In thickener 9 a mixture of potassium magnesium sodium sulfate salt is formed, the said salt is conducted via line 32 to filter 7 or to waste. The solution from distilling column 11 discharged at 12 is conveyed via line 12 to asphalt lined solar evaporation pond 33 where it is evaporated to a concentration of 1.355 specific gravity crystallizing impure sodium chloride. The concentrated solution and solids from the said evaporation pond are pumped by floating pumps to thickener 35 via line 34 and the solution overflowing from said thickener is conveyed via line 36 to the second asphalt lined solar evaporation pond 37 and evaporated to bring about the crystallization of hexahydrate magnesium chloride. The salt together with the brine from solar evaporation pond 37 are pumped by floating pumps to thickener 39 via line 38, the overflowing solution from the said thickener is conveyed via line 40 for the recovery of other salts (e.g. Bromine) and the thickened material is discharged into centrifuge 41 via line 42. The crystalline hexahydrate magnesium chloride is discharged into the direct heated rotary drier 44 via line 43, dried to bihydrate magnesium chloride and conveyed to storage via line 45. The filtrate from the said centrifuge 41 is discharged via line 40.

In the same diagram presented in FIG. 1 is shown an alternative which refers to the addition of saturated solution of potassium chloride in calculated amount of the seawater brine with an aim to adjust the ratio of potassium sulfate to magnesium sulfate in the final product.

As an example can be stated with reference to diagram of FIG. 1. At salting tank 4 a quantity of 66.00 tons of seawater brine concentrated in a solar evaporation pond to a specific gravity of 1.315 is supplied per hour, mixed with 100.00 tons of methanol 99% pure. The brine consists of 4.21 tons of magnesium, 1.35 tons of potassium, 11.70 tons of chlorine, 0.85 tons of sodium, 4.16 tons of sulfate, 0.01 tons of calcium, and 43.75 tons of water. The residence time in the salting tank is adjusted to 10 minutes with only enough agitation to insure a fear good mixture of methanol and brine. The mixture is discharged via line 6 into filter 7 and the cake formed is partially washed on the filter with 10.00 tons of methanol from line 18. The cake from filter 7 is discharged via line 19 into mixing tank 20 and mixed with 20.00 tons of methanol from line 21. The mixture is discharged via line 22 to filter 23. The cake formed on filter 23 after being finally washed with 10.00 tons of methanol from line 24 is conducted via line 26 to the indirect heated rotary drier 27 where it is dried to dryness 5.75 tons of dry salt are discharged via line 28 consisting of 2.49 tons of magnesium sulfate, 2.78 tons of potassium sulfate, 0.06 tons of sodium chloride, 0.38 tons of sodium sulfate, and 0.04 tons of calcium sulfate. About 8.00 tons of methanol vapors from dier 27 are condensed in condenser 30 and the condensed methanol recycled to the process via line 31.

Lines 8 and 25 convey to thickener 9 about 192.23 tons of filtrates and washings from filters 7 and 23 consisting of 132.00 tons of methanol, 16.53 tons of salts and 43.70 tons of water. About 0.38 tons of salts are formed in thickner 9, these salts may be conducted to filter 7 or to waste via line 32.

The clear solution overflowing from thickener 9, about 191.83 tons, consisting of 16.15 tons of salts, 43.70 tons of water, and 132.00 tons of methanol are conducted to distilling column 11, after heat exchange with methanol vapors from the same column at heat exchanger 14. 131.99 tons of methanol vapors and 0.13 tons of water vapors escape at 13 and are condensed in condenser 14 from where the condensed methanol is conducted via line 15 to storage tank 16 from where is recycled to the process. 59.82 tons of solution from distilling column 11 discharged at 12 consisting of 3.68 tons of magnesium, 0.05 tons of potassium, 0.11 tons of sulfate, 0.70 tons of sodium, 11.66 tons of chlorine, and 43.51 tons of water with traces of methanol are conducted to solar evaporation pond 33 and evaporated to a concentration of 1.355 specific gravity. About 2.00 tons of impure sodium chloride are crystallized in the said evaporation pond. 31.13 tons of solution from solar evaporator 33 are pumped by floating pumps to thickener 35 via line 34. The overflowing solution from thickener 35 is conveyed to solar evaporation pond 37 via line 36 and evaporated to a concentration of 1.375 specific gravity bringing about the crystallization of hexahydrate magnesium chloride. The salt and brine from evaporator 37 are pumped by floating pumps to thickener 39 via line 38. The thickened material from thickener 39 is conveyed to centrifuge 41 via line 42. About 10.65 tons of overflowed solution from thickener 39 and filtrate from centrifuge 41 are conducted via line 40 for other salts recovery (e.g.Bromine). 18.50 tons of hexahydrate magnesium chloride from centrifuge 41 are conveyed to direct heated rotary drier 44 via line 43, dried at 188°C to bihydrate magnesium chloride and conveyed to storage via line 45.

In the same diagram FIG. 1, when a saturated solution of potassium chloride is added to the brine in calculated amount, the ratio of potassium sulfate to magnesium sulfate in the dry salt from drier 27 may be varied from about one to one as is the case without addition of potassium chloride up to a suitable value. As an example with reference to the same diagram FIG. 1. The addition of the seawater brine of 30% of the potassium stoichiometrically required for reacting with all the sulfate in excess increases the % of potassium oxide in the final product from 26 to 35 % and decreases the magnesium oxide from 14 to 10 %.

The mixer 20 and filter 23 shown in FIG. 1 of this invention may be excluded if somewhat higher concentration of chlorine can be tolerated in the final product. Good washing on filter 7 may be enough, and filter 1 may be substituted by a thickener.

The salts formed in thickener 9 amount only to 6 % of the total salts recovered, but contain about 13 % of sodium sulfate, these salts instead of being processed together with the salt from salting tank 4 may be processed separatly or wasted.

All quantities stated are understood to be per hour.

From the diagram FIG. 1 and from the sample it is clear that the present invention offers a simple, efficient, versatile, and inexpensive method for recovering potassium and magnesium salt base fertilizers from seawater brines.

To avoid methanol losses by evaporation salting tanks, filters, driers, mixing tanks and thickener are kept close. Vacuum rotary filters and basket centrifuges are suitable for filtering the potassium and magnesium salts. The salting tank referred to in the specification is a circular deep tank with somewhat conical bottom and fitted with a stirring which impels the settled precipitated towards the central discharge. The methanol is mixed with the brine in the salting tank by spraying it at different depths in such a way as to insure a good contact with all the brine. The solar evaporation ponds are of variable depth and size, lined with asphalt to reduce losses by seepage. The thickener, distillation column, rotary drier, and other equipments are as such known apparatuses.

Having now particularly described and ascertained the nature of my said invention, and in what manner the same is to be performed, I declared that what I claim is:

1. A process for the recovery of potassium, magnesium and sulfate from seawater brine in the form of potassium sulfate magnesium sulfate double salt of fertilizer quality, substantially free of sodium chloride, sodium sulfate and other salts, comprising the steps of: (a) Concentrating seawater to a density between about 1.26 and about 1.315 specific gravity; (b) Adding to the said concentrated seawater brine methanol or ethanol at ambient temperature; (c) Agitating the mixture of said seawater brine and methanol or ethanol for a short residence time of about 10 minutes, whereby potassium sulfate magnesium sulfate double salt is formed; (d) Separating the said salt from the liquid phase by filtrations washing and drying the said salt; (e) Conveying the methanol or ethanol vapors from the dryer to a condenser and recycling the condensed methanol or ethanol back to the process; and (f) Conveying the filtrates and washings to a thickener removing the salt formed from the said thickener, removing from the top of the said thickener the clear solution and conveying it to a distillation column and conveying the methanol or ethanol vapors from the said distillation column to a condenser and recycling the condensed methanol or ethanol in the process for recovering new amount of the said potassium sulfate magnesium sulfate double salt.

2. A process as claimed in claim 1, in which the methanol or ethanol is added in an amount of about 60 % by weight of the said seawater brine alcohol mixture.

3. A process as claimed in clain 1 for desulfating seawater brine, in which the sulfate ($SO_4$) contained in the said brine is recovered as potassium sulfate magnesium sulfate double salt.

4. A process as claimed in claim 1, characterized in this that the filtrates and washings from the process are conveyed to a thickener where some more potassium sulfate magnesium sulfate double salt is formed, comprising the steps of conveying the said filtrates and washings to the thickener, conveying the said salt to filters, washing and drying it, conveying the filtrates and washings back to the thickener and conveying the clear overflow solution from the thickener to a distillation column and conveying the methanol or ethanol vapors from the said distillation column to a condenser and recycling the said condensed vapors in the process for recovering new amount of the said salt.

5. A process as claimed in claim 1, characterized in this by the addition of a calculated amount of potassium in the form of a saturate solution of potassium chloride to the concentrated seawater brine before the addition to the said brine of methanol or ethanol, for producing a wide range of fertilizers, whereby the ratio of potassium sulfate to magnesium sulfate in the final product may be varied. The quantity of potassium to be added to the brine should not substantially exceed the 30 % stoichiometrically required for reacting with all the sulfate ($SO_4$) present in excess in the seawater brine.

* * * * *